(12) United States Patent
Hui (10) Patent No.: US 7,810,278 B2
(45) Date of Patent: Oct. 12, 2010

(54) UNATTENDED PLANT WATERING SYSTEM

(76) Inventor: John Hui, 14726 Ramona Ave., Suite 201, Chino, CA (US) 91710

(*) Notice: Subject to any disclaimer, the term of this patent is extended or adjusted under 35 U.S.C. 154(b) by 0 days.

(21) Appl. No.: 12/536,105

(22) Filed: Aug. 5, 2009

(65) Prior Publication Data
US 2009/0288342 A1 Nov. 26, 2009

Related U.S. Application Data

(62) Division of application No. 11/405,720, filed on Apr. 18, 2006, now Pat. No. 7,644,537.

(51) Int. Cl.
*A01G 27/00* (2006.01)
(52) U.S. Cl. ............................ 47/48.5; 47/79
(58) Field of Classification Search ............... 47/48.5, 47/79, 40.5, 80, 81, 82, 83; 239/37, 38, 43
See application file for complete search history.

(56) References Cited

U.S. PATENT DOCUMENTS

| | | | |
|---|---|---|---|
| 4,194,691 A | 3/1980 | Birnbach et al. | |
| 4,347,687 A | 9/1982 | Sibbel | |
| 4,838,310 A | 6/1989 | Scott et al. | |
| 4,934,096 A | 6/1990 | Bentvelsen | |
| 5,020,275 A | 6/1991 | Bednarzik | |
| 5,351,437 A | 10/1994 | Lishman | |
| 5,525,505 A | 6/1996 | Young et al. | |
| 5,542,605 A * | 8/1996 | Campau | 239/44 |
| 5,597,731 A | 1/1997 | Young et al. | |
| 5,806,240 A * | 9/1998 | Racine | 47/79 |
| 5,896,700 A * | 4/1999 | McGough | 47/48.5 |
| 6,128,856 A * | 10/2000 | Doan | 47/48.5 |
| 6,161,329 A | 12/2000 | Spelt | |
| 6,219,963 B1 * | 4/2001 | Wang | 47/48.5 |
| 6,225,915 B1 | 5/2001 | Lobert | |
| 6,345,470 B1 | 2/2002 | Slaght et al. | |
| 6,568,425 B2 | 5/2003 | Gergek | |
| 6,684,563 B2 * | 2/2004 | Wu | 47/48.5 |
| 7,240,457 B1 * | 7/2007 | Chang | 47/48.5 |
| 2001/0023555 A1 * | 9/2001 | Buss et al. | 47/48.5 |
| 2002/0020111 A1 * | 2/2002 | Rosenberg | 47/48.5 |
| 2006/0032119 A1 * | 2/2006 | Amsellem | 47/48.5 |

FOREIGN PATENT DOCUMENTS

EP 0 309 059 3/1989

* cited by examiner

*Primary Examiner*—T. Nguyen
(74) *Attorney, Agent, or Firm*—Cislo & Thomas, LLP (57) ABSTRACT

An apparatus is provided for unattended watering of plants over an extended period of time utilizing a watering system that regulates a partial vacuum to control the discharge of water to the roots of the plants. A water reservoir is provided having an encapsulated interior cavity and an exterior exposed to ambient air, and having upper and lower ends. The reservoir is located above the root level of a plant to be watered. At least one drain opening is defined in the lower end of the reservoir. The upper end of the reservoir is closed and is provided with an adjustable valve, preferably a pinch valve, and an air conduit, preferably a flexible tube, that passes through the valve and extends between the interior and the exterior of the reservoir. The valve thereby interacts with the conduit to partially obstruct air flow through it, so as to maintain a partial vacuum in the upper end of the reservoir as water drains from the lower end of the reservoir.

2 Claims, 7 Drawing Sheets

FIG.7

UNATTENDED PLANT WATERING SYSTEM

CROSS-REFERENCES TO RELATED APPLICATIONS

This patent application is a divisional and claims the benefit of U.S. patent application Ser. No. 11/405,720 filed Apr. 18, 2006 now U.S. Pat. No. 7,644,537 for UNATTENDED PLANT WATERING SYSTEM, which application is incorporated here by this reference.

TECHNICAL FIELD

The present invention relates to an unattended system for watering live, growing plants, with particular applicability to potted houseplants. The plant watering system of the invention allows a plant owner to leave live houseplants unattended for days, 10 weeks, and even months at a time, yet ensures that a plant receives the appropriate amount of water throughout the duration of the owner's absence.

BACKGROUND ART

One problem that has for years faced the owners of potted houseplants who travel from home more than a few days at a time is the problem of attending to the watering of such houseplants. Some potted houseplants are very valuable, costing as much as several hundred dollars each. Therefore, such plants represent a considerable monetary investment. Other potted houseplants, though having considerably less monetary value, nevertheless are quite important to their owners due to an emotional or sentimental attachment. In either case, the owners of such plants go to considerable me owner's absence.

One solution to the problem of the requirement for water by plants that plant owners often choose is to request a friend or neighbor to come into the plant owner's residence and water the plants at appropriate intervals. This solution has several drawbacks, however. First of all, it does require imposing on the person requested to perform the plant watering chore. Also, some individuals are reluctant to have other people in their residences during their absence. Furthermore, there is always the chance that the person requested to water the plants will forget to do so, since such a chore is not part of that person's regular routine.

Another solution that plant owners sometimes adopt is to transport their plants to the abode of a trustworthy friend or neighbor who can then water the plants at his or her own premises during the plant owner's absence. This solution likewise has disadvantages. Some plants are quite large and cannot easily be transported. Furthermore, the plants can easily become damaged during the transfer from and return to the plant owner's residence. Also, considerable physical effort is often required in transporting large houseplants and/or many houseplants. In addition, some plants will not thrive in a different environment due to differences in levels of sunlight, temperature, humidity, or damage from the actions of children or pets.

Automated plant watering systems have been devised that provide unattended houseplants with water according to a programmed schedule. Such automated systems can involve a computer controlled operation of relays and valves to release water to one or more growing plants according to a schedule. However, such automated systems are quite expensive. Furthermore, they involve a considerable amount of control hardware that occupies space that is often at a premium. In addition, such automated plant watering systems typically involve extended irrigation piping and control lines which are unsightly and which are obstructions that make normal cleaning of the premises more difficult. Even if the automated control is a simple electric timer, it typically operates from a household wall current outlet, and therefore is susceptible to disruption by power outages.

DISCLOSURE OF INVENTION

The present invention is a simple, but very reliable unattended plant watering system that requires no electrical power and no cabling or controls that extend outside of the container for the potted plant. The plant watering system of the invention operates upon the principal of vacuum restrained flow of water from an encapsulated reservoir. It is well known that as water flows through a small drain out of the bottom of a container, the top of which is closed, a partial vacuum will be created at the upper end of the container above the water level unless air is admitted to fill the space vacated by the water. If no air is admitted into the space out of which the water has flowed, the partial vacuum created above the water level will restrict further flow of water out of the container, and may even prevent further flow entirely, depending upon the cross-sectional area of the drain opening in the container.

Laboratory pipetting works upon the principal of retention of water in a container having an open outlet at its bottom by the creation of a partial vacuum above the water. A siphon operates upon the same principle. However, the principal of use of a partial vacuum above the level of water in a container has not heretofore been used to regulate the flow of water to potted plants.

In one broad aspect the present invention may be considered to be an apparatus for watering plants comprising: a water reservoir having an encapsulated interior cavity and an exterior exposed to ambient air. The reservoir has upper and lower ends and is located above the root level of the plant to be watered. At least one drain opening is defined in the lower end of the water reservoir. The upper end of the water reservoir is closed and is provided with an adjustable valve therein. An air conduit passes the valve and extends between the interior and the exterior of the reservoir. As a result, the valve interacts with the conduit to maintain a partial vacuum in the upper end of the reservoir as water drains from the lower end thereof. Preferably, the drain opening has a cross-sectional area of no less than about 0.00123 square inches and no greater than about 0.0123 square inches.

Preferably also the conduit has a flexible wall and the valve is a pinch valve. The upper end of the water reservoir is provided with a fill opening and a removable cap that is sealable in fluid tight engagement in the fill opening. The pinch valve is located within the cap.

In a preferred embodiment the cap is provided with an upwardly directed cylindrical positioning socket surrounded by a cylindrical annular, channel-shaped recess. The conduit passes through the periphery of the cylindrical annular recess. The pinch valve is formed with a disk-shaped dial having a cylindrical centering post that fits into the positioning socket. The centering post is rotatable within the positioning socket. The valve has an annular valve closure member that is disposed about the centering post and extends into the cylindrical, annular recess. The annular valve closure member is formed with a valve closure lobe.

Rotation of the dial rotates the centering post within the positioning socket and rotates the valve closure lobe with it so that the valve closure lobe presses against the flexible wall of the conduit to collapse the conduit against the cap to a variable extent in accordance with the angular orientation of the dial relative to the cap. The valve closure member may have an outer periphery shaped as a radial spiral relative to the centering post which forms the valve closure lobe.

The unattended plant watering system may be further comprised of a flow dispensing cup located beneath the reservoir and including a transverse floor at its bottom. A plurality of dispensing cups outlets are defined in the dispensing cup floor. A flow distribution apparatus may be located within the flow dispensing cup and beneath the reservoir to distribute water flow from the drain opening in the reservoir uniformly to the dispensing cup outlets.

In such an arrangement a tray may be provided for seating the reservoir. The tray has a floor located a spaced distance beneath the lower end of the reservoir. The flow distribution apparatus may be comprised of a water flow deflecting pyramid located beneath the tray and seated in the flow dispensing cup. The drain opening in the reservoir may be located on one side of the lower end of the reservoir. The tray has a floor drain located centrally beneath the lower end of the reservoir. The apex of the flow deflecting pyramid is located vertically and directly beneath the floor drain. As a result, the flow deflecting pyramid deflects the flow of water down its faces equally about the perimeter of the pyramid base and about the periphery of the flow dispensing cup.

In an alternative arrangement the flow distribution apparatus may be comprised of a balance support located above the transverse bottom of the flow dispensing cup. A balance arm has opposing ends and is supported for rotation between its opposing ends about a horizontal axis by the balance support. A concave upwardly facing water drip collection bucket is located on one of the ends of the balance arm and directly beneath the drain opening in the lower end of the reservoir. A counterbalancing weight is located on the other of the ends of the balance arm.

In another aspect the invention may be considered to be the combination of a plant container having soil therein for a live plant having roots growing in the soil, a water reservoir located above the roots of the plant, an air conduit and an adjustable valve. The water reservoir is comprised of a closed, hollow container having an exterior exposed to ambient air and an encapsulated interior cavity. The container has upper and lower ends and at least one drain opening is defined in the lower end of the container. The upper end of the container is closed. The air conduit extends between the exterior and the interior of the container. The adjustable valve regulates air flow through the conduit to allow a controlled partial vacuum to be created within the upper end of the container. This partial vacuum limits flow of water to the roots of the plant out of the drain opening in the lower end of the container so that the plant is slowly watered over an extended period of time.

The conduit is preferably comprised of flexible walled tubing defining a lumen therethrough and the valve is preferably a pinch valve. The lumen preferably has a diameter of no greater than about one-eighth of an inch, or a cross-sectional area at the valve of no greater than about 0.0123 square inches. Also, the drain opening preferably has a cross-sectional area no greater than about 0.0123 square inches.

In the preferred construction a circular fill opening is defined in the upper end of the water reservoir and the valve is located in a removable, generally disk-shaped cap that is engageable fluid tight in the fill opening. The cap has a body defining a central guide socket and a cylindrical, annular recess that surrounds the guide socket. The flexible walled tubing passes across the cylindrical, annular recess.

The valve has a moveable valve element that includes a dial, a centering post depending from the dial, and an annular valve closure cam lobe. The centering post on the underside of the dial fits into the central guide socket in the cap body and is rotatable within it. The valve closure cam lobe depends from the underside of the dial and is radially displaced from the centering post. The dial is rotatable to bring the valve closure cam lobe into contact with the flexible walled tubing with a pressure that varies with angular rotation of the dial relative to the cap body. The cam lobe is rotatable with the dial to press the flexible walled conduit against the structure of the cap body to constrict the lumen to a selectively adjustable degree.

Different physical embodiments are possible. For example, the cam lobe may project downwardly parallel to the axis of the socket and centering post with the flexible conduit passing beneath it. In a preferred embodiment, however, the flexible conduit passes through the annular recess in the cap at its periphery, and the cam lobe projects radially relative to the centering post and has a spiral shaped peripheral edge.

Preferably a flow dispensing cup is located beneath the reservoir and has a transverse floor spaced beneath the lower end of the reservoir. The dispensing cup includes a plurality of dispensing cup flow outlets in its floor. Flow dispensing drain tubes are coupled to at least some of the dispensing cup flow outlets in the floor of the flow dispensing cup. The flexible, perforated drain tubes extend into the soil toward the roots of the plant.

Some apparatus is provided for distributing the flow of water from the reservoir drain uniformly to the dispensing cup flow outlets in the floor of the flow dispensing cup. This apparatus may be comprised of a tray located beneath the lower end of the reservoir and having a floor spaced beneath the lower end of the reservoir. A single, central drain is defined through the floor of the tray. A water flow deflection pyramid is provided having an apex located vertically and directly beneath the central drain in the floor of the tray. The base of the flow deflecting pyramid is seated in the flow dispensing cup.

In another embodiment of the invention the apparatus for distributing flow of the water is comprised of a tip bucket mounted directly beneath the drain opening in the lower end of the reservoir and above the transverse floor of the flow dispensing cup. As water drips from the drain opening in lower end of the reservoir it accumulates in the tip bucket. Once a sufficient weight of water has accumulated in the tip bucket, the tip bucket becomes unbalanced and tips over, discharging the water onto the floor of the flow dispensing cup. The purpose of employing a tip bucket is to build up a substantial volume of water so that it will flow evenly into the plurality of outlets from the flow dispensing cup. If the water were simply to drip onto the floor of the flow dispensing cup, it might continually gravitate toward a single one of the openings in the flow dispensing cup to the exclusion of the other dispensing cup flow outlets.

Flexible, radially perforated drain tubes may be coupled to at least some of the flow dispensing outlets in the floor of the flow dispensing cup. Such perforated drain tubes may be positioned so as to extend into the soil toward the roots of the plant. The plant is thereby provided with water distributed throughout its root system.

In another broad aspect the invention may be considered to be a method of controlled watering over an extended period of time of a live plant having roots growing in soil. The method is comprised of the steps of planting the plant in soil and providing the plant with a watering apparatus including a reservoir having an encapsulated interior cavity and an exterior exposed to ambient air. The reservoir has upper and lower ends. The upper end of the reservoir is closed and is provided with an adjustable valve therein. An air conduit passes through the valve and extends between the interior and the exterior of the reservoir. The lower end of the reservoir is provided with at least one drain opening.

The method includes the further steps of positioning the reservoir so that the lower end of the reservoir is elevated above the lower extremities of the roots of the plant, filling the reservoir at least partially with water, and adjusting the valve. The valve is adjusted to create a partial vacuum in the upper end of the reservoir as water flows out of the drain opening. This limits the flow of water out of the drain opening to thereby ensure a supply of water to the plant roots for at least a predetermined duration of time.

The conduit is preferably a flexible walled tube defining a lumen therethrough. The valve is preferably a pinch valve. The pinch valve is preferably selectively adjusted to exert a sufficient force on the flexible walled tube to collapse the lumen of the flexible walled tube to a desired degree. The flow of water from the reservoir drain is preferably dispersed to selectively direct water to the roots of the plant.

The invention may be described with greater clarity and particularity by reference to the accompanying drawings.

BEST MODE FOR CARRYING OUT THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
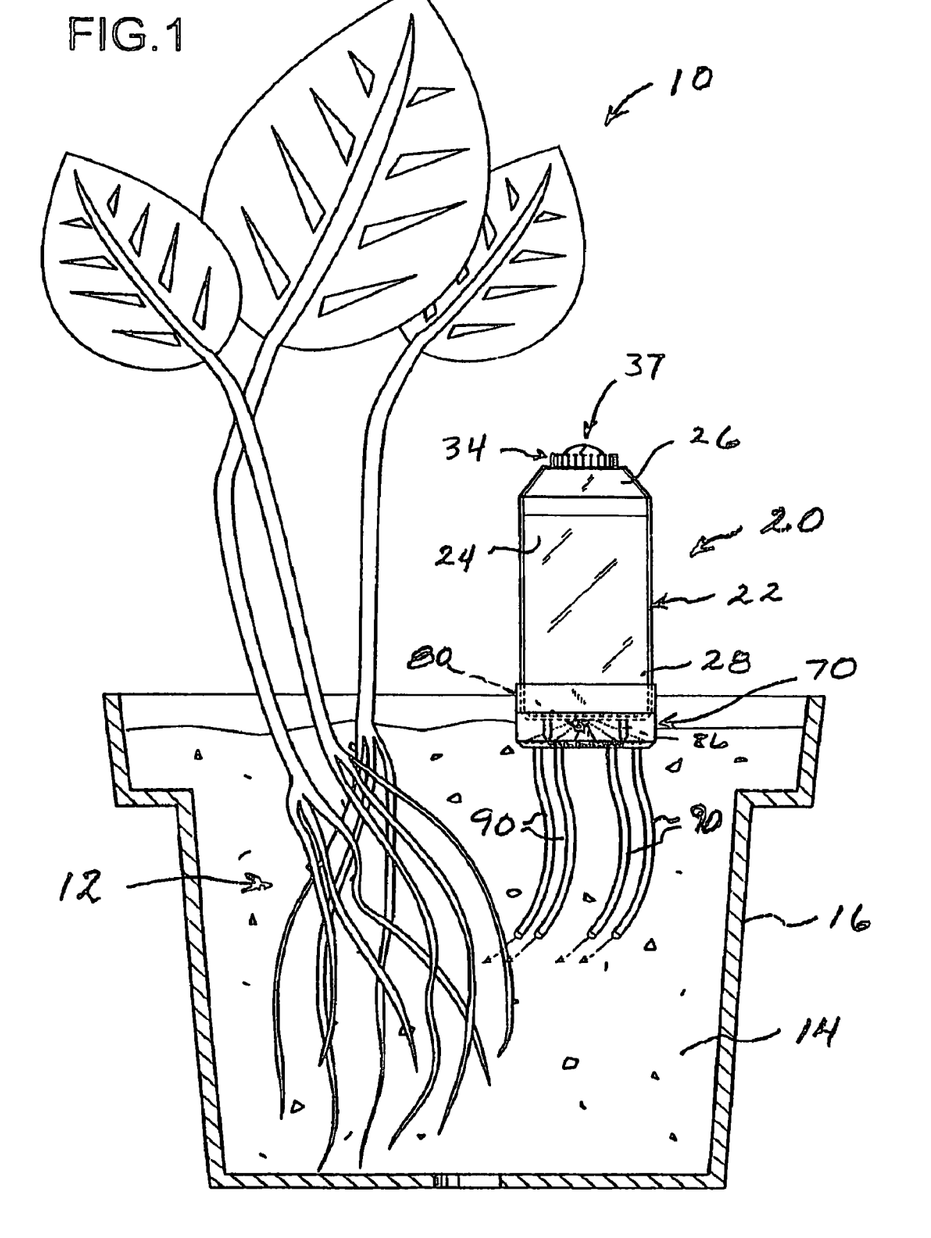
FIG. 1 is a sectional elevational view through the pot of a potted plant and illustrating the unattended watering system of the invention.

FIG. 1 illustrates a plant 10 having a root system 12 planted in soil 14 within a pot 16. Plants 10 are potted in this way on a widespread basis as indoor house plants.

In a normal routine the owner of a plant 10 will typically manually water it every few days, once a week, or perhaps even less often, depending upon the ambient conditions and the type of plant 10 involved. In any event, when the owner of the plant 10 is to be absent for an extended period of time, some arrangement must be made for the plant 10 to be watered, or it will die.

According to the present invention an apparatus 20 is provided for watering the plant 10 on an unattended basis. The apparatus 20 is comprised of a water reservoir 22 having an encapsulated interior cavity and an exterior 24 exposed to ambient air. The reservoir 22 has an upper end 26 and a lower end 28. The reservoir 22 is located above the level of the root system 12 of the plant 10 to be watered.

Figure 2:
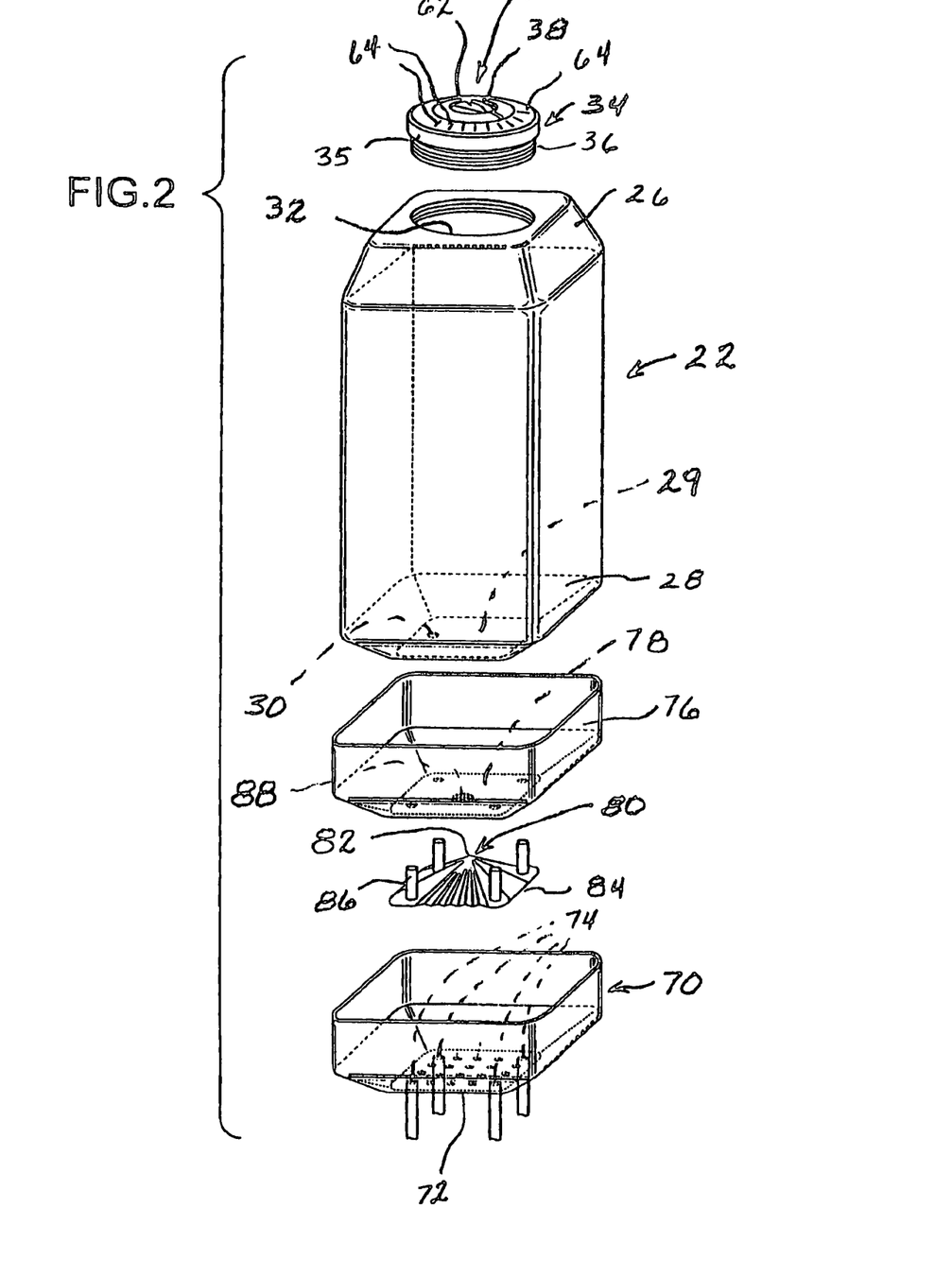
FIG. 2 is an exploded perspective view illustrating one preferred embodiment of the plant watering system of the invention.

As illustrated in FIG. 2, the reservoir 22 has at least one drain opening 30 defined through the transverse floor 29 in its lower end 28. A circular fill opening 32 that is internally threaded is formed in the upper end 26 of the reservoir 22. The fill opening 32 is closed by a removable cap 34 that is sealable in fluid tight engagement in the fill opening 32. The cap 34 has a body 35 from which an annular, externally threaded closure portion 36 depends that screws into the fill opening 32.

Figure 4:
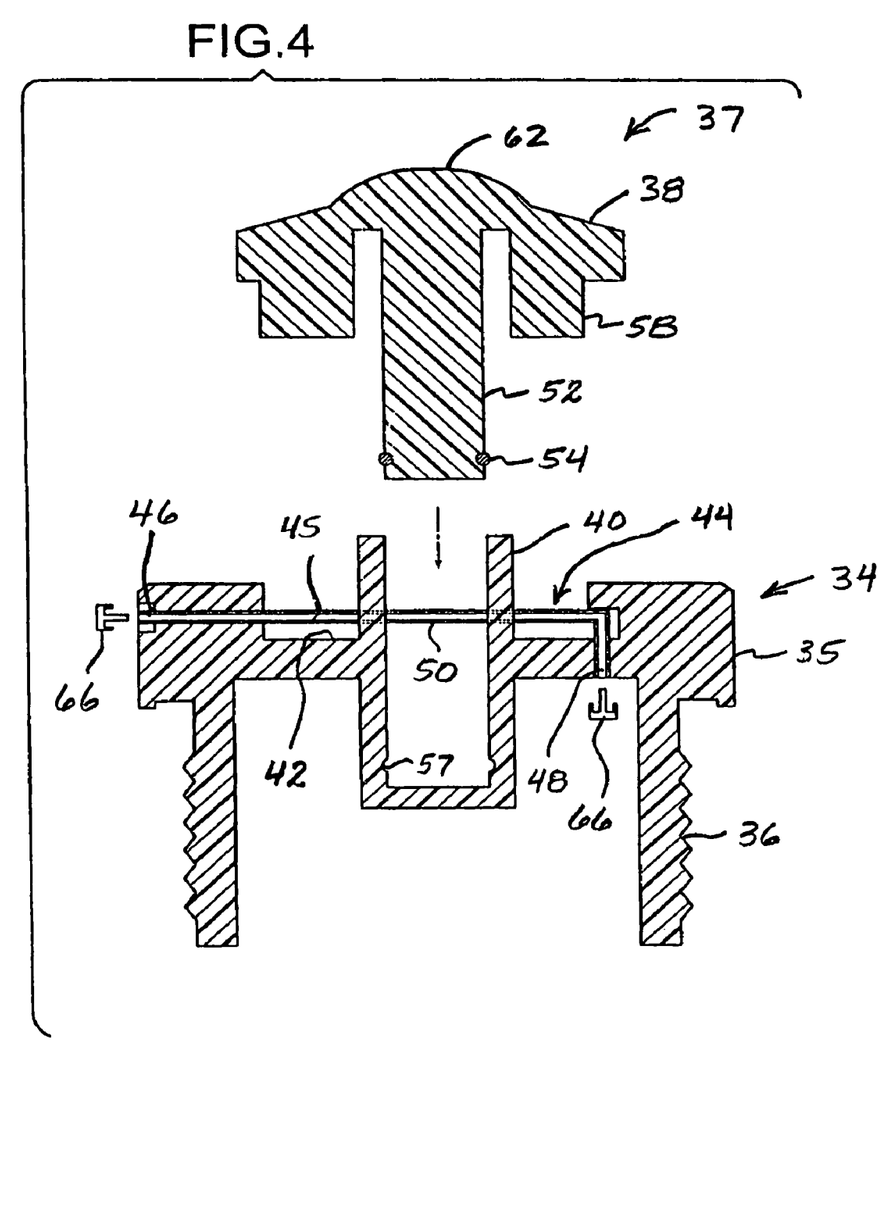
FIG. 4 is an exploded sectional elevational view thereof.
Figure 5:
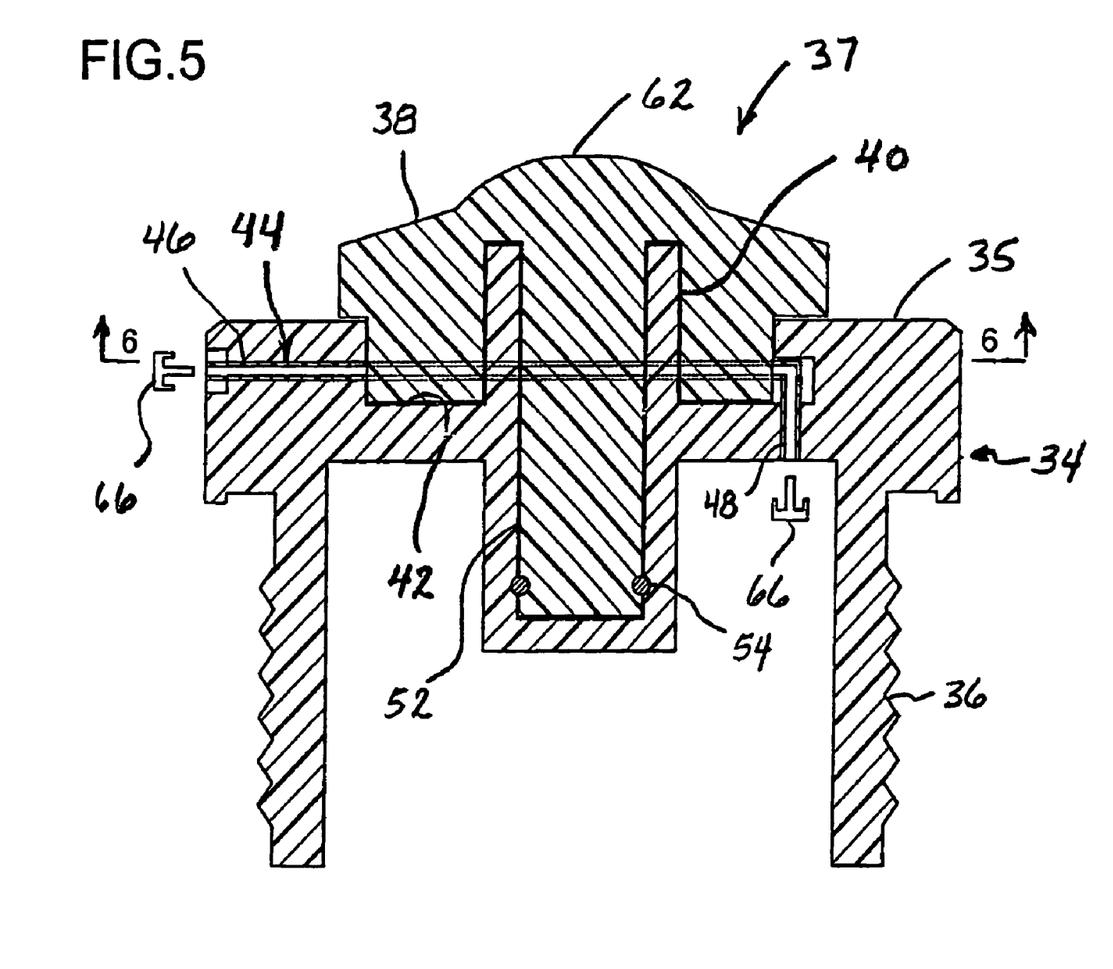
FIG. 5 is a sectional elevational view showing the components of FIG. 4 in an assembled and operative condition.

As illustrated in FIGS. 4 and 5, the cap 34 is provided with an upwardly directed central, cylindrical positioning socket 40 surrounded by a cylindrical, annular channel-shaped recess 42.

Figure 3:
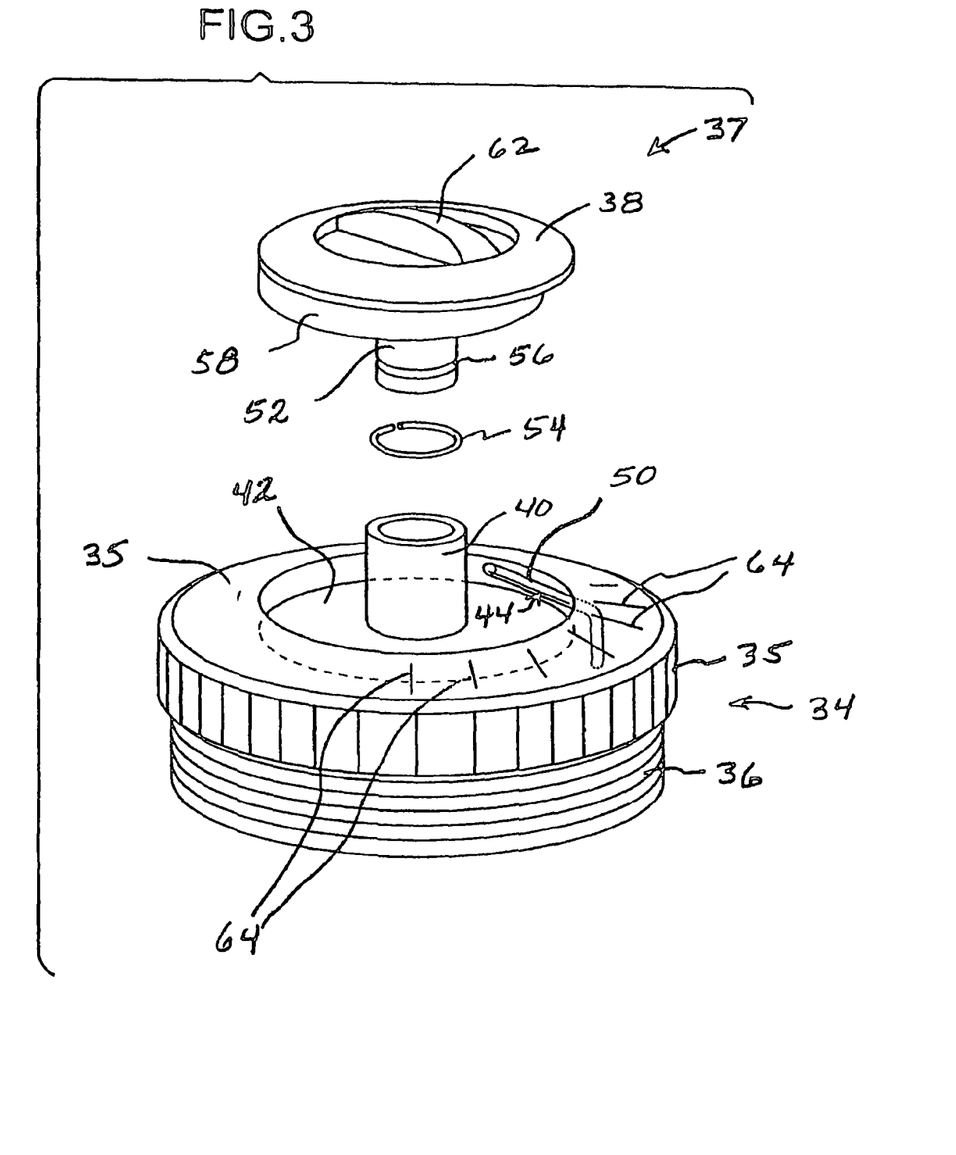
FIG. 3 is an exploded perspective view illustrating the cap, valve, and flexible conduit of a preferred embodiment of the invention.

The watering apparatus 20 also includes a length of flexible tubing that forms a conduit 44. The conduit 44 has opposing ends 46 and 48 and a central region 50, visible in FIG. 3. The conduit 44 passes tangentially through the periphery of the cylindrical, annular recess 42. As illustrated in FIG. 5, the ends of the conduit 44 can be closed by plugs 66 when the watering system 20 is not in use.

An adjustable pinch valve 37 is mounted within the cap 34. The pinch valve 37 is formed with a disk-shaped dial 38 having a cylindrical centering post 52 depending from its underside. A C-shaped ring 54 is set into a radial, channel-shaped seating groove 56 in the lower extremity of the centering post 52. The centering post 52 fits into the positioning socket 40 in the cap 34 and is rotatable therewithin. The C-shaped ring engages a corresponding radially inwardly facing channel-shaped groove 57 in the inner wall of the positioning socket 40 to attach the movable valve element to the cap 34.

The valve 37 also includes an annular valve closure member 58 disposed about the centering post 52 in radial displacement therefrom. The annular valve closure member 58 extends into the cylindrical, annular recess 42.

Figure 6:
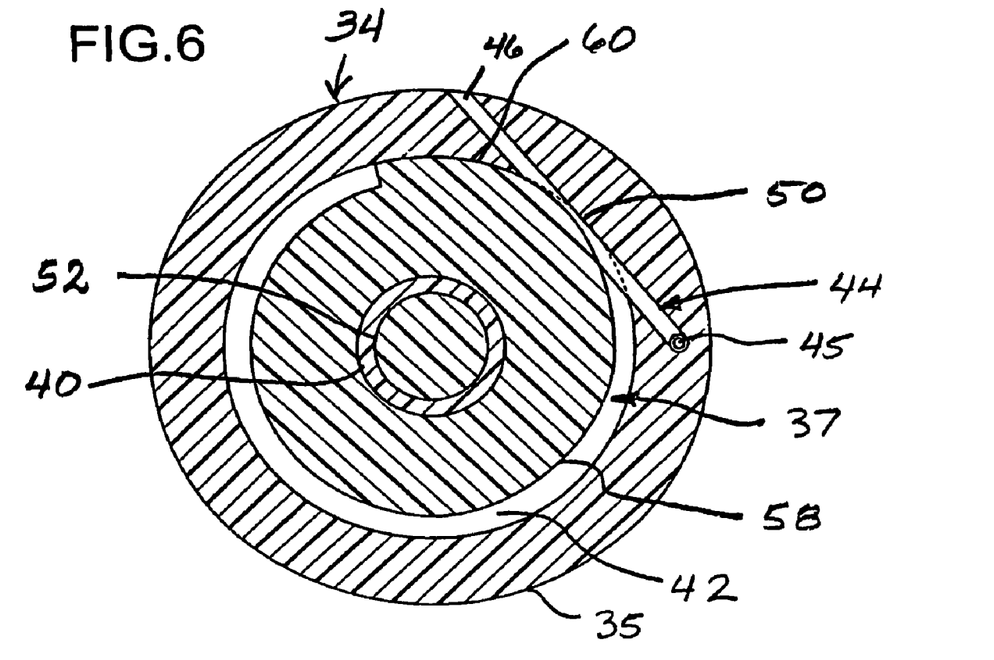
FIG. 6 is a transverse sectional view taken along the lines 6-6 of FIG. 5 illustrating the pinch valve severely restricting the flow of water through the flexible conduit.
Figure 7:
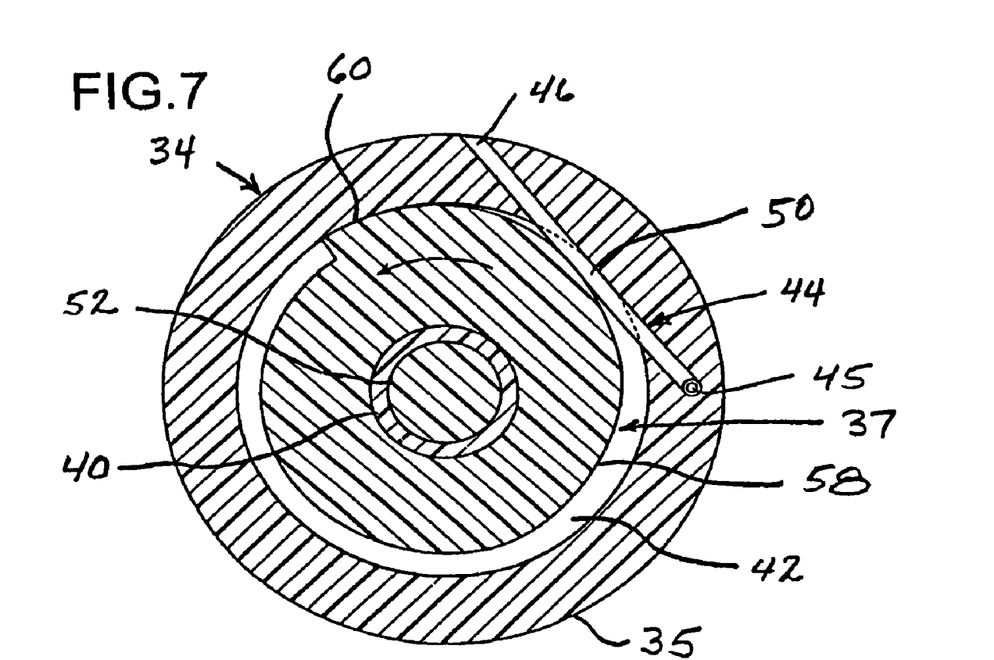
FIG. 7 is a transverse sectional view taken along the lines 6-6 of FIG. 5 illustrating the valve adjusted to allow a significantly greater flow of water through the pinch valve.

As best illustrated in FIGS. 6 and 7, the annular valve closure member 58 has an outer periphery shaped as a radial spiral relative to the centering post 52. The valve closure member 58 is thereby formed with a valve closure lobe 60 at its radially thickest point.

The upper, exposed portion of the valve dial 38 is formed with a pointer 62 that can be rotated relative to indicia 64 formed or inscribed onto the upper surface of the body 35 of the cap 34 to provide gradations of rotation of the valve closure lobe 60 relative to the central region 50 of the conduit 44. The angular position of the pointer 62 indicates different rates of water flow from the reservoir 22 through the drain opening 30.

Rotation of the valve dial 38 rotates the centering post 52 within the positioning socket 40 and also rotates the valve closure lobe 60 within the channel-shaped recess 42 in the cap 34. As the valve closure lobe 60 is rotated toward the central region 50 of the conduit 44, it increasingly presses against the flexible walled conduit 44 at the central region 50 thereof to collapse the conduit 44 against the body 35 of the cap 34. The pressure that the valve closure lobe 60 exerts against the cap 34 is variable in accordance with the angular orientation of the dial 38 relative to the cap 34. The more nearly radially aligned the valve closure lobe 60 is with the central portion 50 of the conduit 44, the more the valve closure lobe 60 presses against the conduit 44 and collapses its central region 50 thereof against the body of the cap 34, as illustrated in FIG. 6.

Rotation of the dial 38 of the valve 37 causes the valve 37 to interact with the conduit 44 to maintain a partial vacuum in the upper end 26 of the reservoir 22 as water drains from the lower end 28 thereof through the drain opening 30. For example, if the dial 38 is angularly oriented within the body 35 of the cap 34 so as to align the valve closure lobe 60 in substantial radial alignment with the central region 50 of the conduit 44, as illustrated in FIG. 6, the lumen 45 formed within the conduit 44 will be almost totally collapsed, thereby allowing ambient air to flow from the outer end 46 of the conduit 44 to the inner end 48 thereof at only a very extremely slow rate. As a result, as water flows out of the reservoir 22 through the drain opening 30, its rate of flow diminishes drastically, since a partial vacuum is created in the upper end 26 of the reservoir 22, above the level of the water within the reservoir 22. Consequently, water will be delivered from the reservoir 22 through the drain opening 30 to the roots 12 of the plant 10 at only a very extremely slow rate. Accordingly, the plant 10 will not be overly watered, yet will receive a small amount of water continuously to sustain its root system 12. Such a condition is ideal for plants 10 of the type that do not require a large amount of water.

On the other hand, in order to properly water plants 10 that require larger amounts of water with greater frequency, the pinch valve 37 should be adjusted accordingly. In such a situation the dial 38 will be counterrotated which counterrotates the valve closure member 58, as indicated in FIG. 7. This creates a greater angular separation between the valve closure lobe 60 and the central region 50 of the conduit 44, thereby reducing radial pressure on the flexible wall of the conduit 44. In such a situation the lumen 45 within the conduit 44 is collapsed to only a very small degree, thereby allowing ambient air to flow through the conduit 44 and into the upper end 26 of the reservoir 22 much more freely. As a consequence, as water from the reservoir 22 drains out of the lower end 28 thereof through the drain opening 30, the water discharged from the reservoir 22 is replaced in volume much more quickly by ambient air passing into the upper end 26 of the reservoir 22 through the conduit 44. As a result the partial vacuum in the upper end 26 of the reservoir 22 will be relieved more quickly so that water will drain out of the drain opening 30 and be conducted to the root system 12 of the plant 10 much more rapidly.

It is apparent that the user can precisely control the rate of watering of the plant 10 by proper manipulation of the dial 38 relative to the body 35 of the cap 34. The gradations 64 aid the user in selecting the proper angular orientation of the valve closure lobe 60 relative to the central region 50 of the conduit 44.

The size of the drain opening 30 is quite important. It must be small enough so that the viscosity of the water prevents air bubbles from bubbling up through the drain opening 30, as this would prevent the formation of a partial vacuum in the upper end 26 of the reservoir 22. On the other hand, the drain opening 30 must be large enough so that the surface tension of the water does not prevent drainage. Preferably, a drain opening 30 has a cross-sectional area no greater than about 0.0123 square inches and no less than about 0.00123 square inches. Likewise, preferably the lumen 45 defined through the conduit 44 likewise has a cross-sectional area in an uncollapsed condition of no greater than about 0.0123 square inches and no less than about 0.00123 square inches. Where the conduit 44 and the drain opening 30 are formed with cross-sectional areas within this range, the pinch valve 38 can successfully create and relieve a partial vacuum as required in the upper end 28 of the reservoir 22.

In preferred embodiments of the invention the watering system 20 is provided with a system for properly and evenly distributing water throughout the plant root system 12, even when the rate of flow of water out of the drain opening 30 is extremely low. As illustrated in FIG. 2, the watering system 20 is further comprised of a flow dispensing cup 70 that is located beneath the reservoir 22 and which includes a transverse floor 72 having a plurality of outlets 74 therefrom. To ensure proper distribution of water to the root system 12 of the plant 10, it is often advisable to provide a plurality of flexible, perforated drain tubes 90 that lead from at least some of the openings 74 in the floor 72 to extend through the soil 14 throughout the root system 12 of the plant 10.

Also, a flow distribution apparatus may be located within the flow dispensing cup 70 and beneath the reservoir 22 to distribute water flow from the drain opening 30 in the reservoir 22 uniformly to the dispensing cup outlets 74. In the embodiment illustrated in FIG. 2 the flow distribution apparatus is comprised of a concave upwardly shaped tray 76 for seating the reservoir 22 within its confines. That is, the lower end 28 of the reservoir 22 fits snugly within the confining, generally vertical surrounding walls of the tray 76.

The tray 76 has a transverse floor 78 located a spaced distance beneath the floor 29 of the lower end 28 of the reservoir 22. The flow distribution apparatus is further comprised of a water flow deflecting pyramid 80 having an apex 82 and a substantially square base 84. At its corners the pyramid 80 has four upwardly projecting spacing posts 86 that hold the floor 78 of the tray 76 a spaced distance above the pyramid apex 82. The posts 86 extend just slightly beyond the height of the pyramid apex 82 above its base 84.

As illustrated in FIG. 2, the floor 78 of the tray 76 has a centrally located floor drain 88 located beneath the lower end 28 of the reservoir 22 in a spaced distance of separation from the floor 29 thereof. The apex 82 of the flow deflecting pyramid 80 is located directly beneath the floor drain 88, also in spaced separation therefrom. The flow deflecting pyramid 80 has a plurality of triangular-shaped faces about its sides that deflect the flow of water equally about the perimeter of the base 84 of the flow deflecting pyramid 80. Water flow is thereby also uniformly deflected and distributed about the periphery of the flow dispensing cup 70, so that it flows uniformly inwardly towards the center of the floor 72 and uniformly out through the drain openings 74.

The floor 72 of the flow dispensing cup 70 may be initially constructed with a matrix of thin, disk-shaped webs that may be easily punched out to create the dispensing cup outlets 74. The flexible rubber tubing may be cut from a roll to suitable lengths to form the drain tubes 90. The upper ends of the drain tubes 90 may be inserted into the punched out openings forming the dispensing cup outlets 74. The drain tubes 90 may thereby carry the water emptied into the cup 70 uniformly to the root system 12 of the plant 10.

Figure 8:
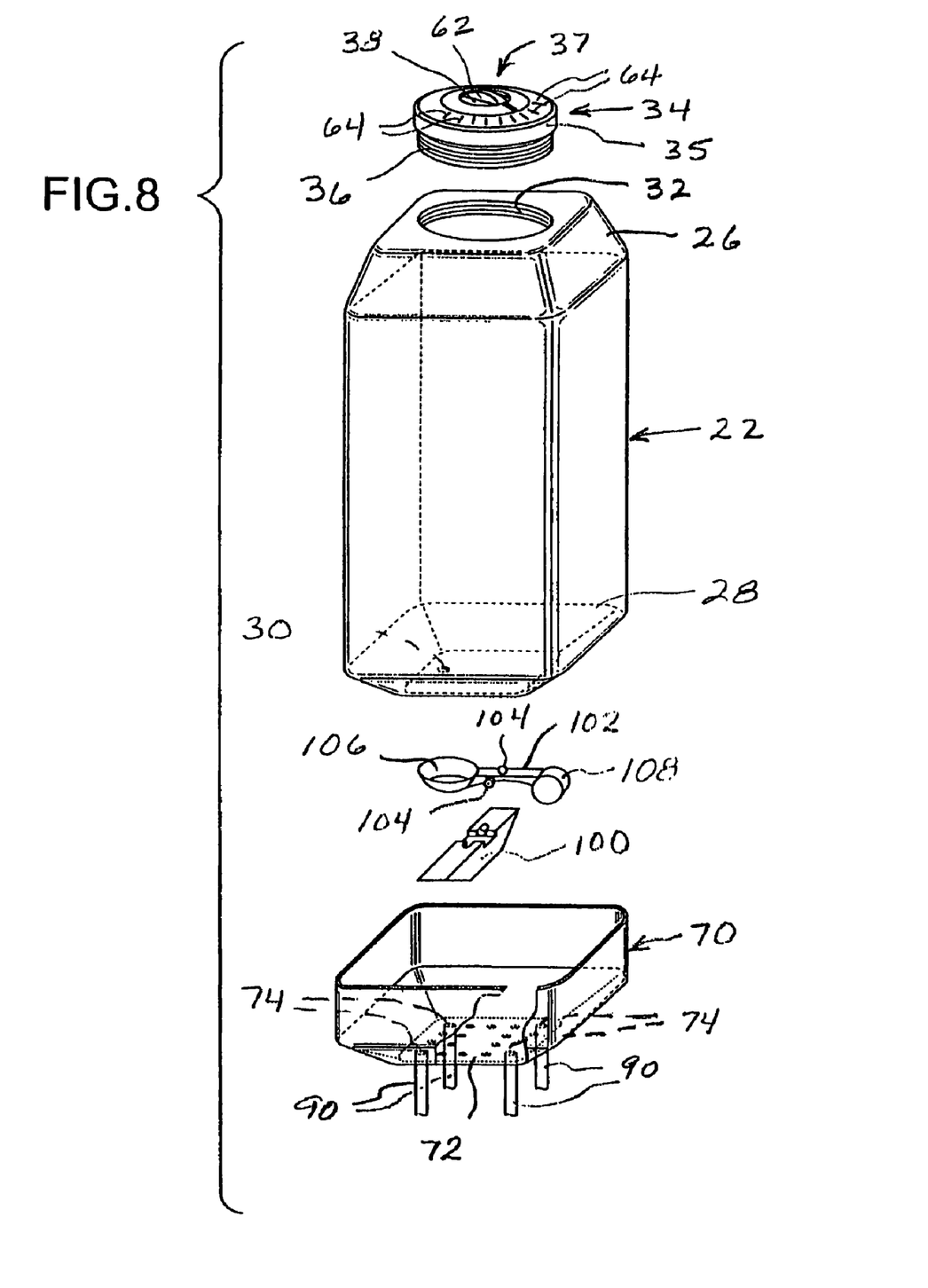
FIG. 8 is an exploded perspective view illustrating an alternative embodiment of an unattended watering system according to the invention.

FIG. 8 illustrates an alternative embodiment of the invention in which a different flow distribution apparatus is substituted for the pyramid 80. In the embodiment of FIG. 8 a balance support 100 is located above the transverse bottom floor 72 of the flow dispensing cup 70. A balance arm 102 having opposing ends is supported for rotation about stub axles 104 that are journaled in corresponding depressions defined in the balance support 100. A concave, upwardly facing water drip collection bucket 106 is located at one of the ends of the balance arm 102. A counterbalancing weight 108 is located at the other end of the balance arm 102. The drip collection bucket 106 is located directly beneath the drain opening 30 in the floor 29 at the lower end 28 of the reservoir 22. The balance arm 102 rotates about a horizontal axis defined by the coaxial alignment of the stub axles 104.

The balance arm 102, bucket 106, and counterweight 108 supported by the balance support 100 form a tip bucket assembly mounted directly beneath the drain opening 30 in the lower end 28 of the reservoir 22. This tip bucket apparatus is mounted above the transverse floor 72 of the flow dispensing cup 70.

According to the method of the invention the plant 10 is planted in the soil 14 and provided with the plant watering apparatus 20. The plant watering apparatus 20 includes the reservoir 22 which is positioned so that the lower end 28 of the reservoir 22 is at an elevation above the lower extremities of the roots 12 of the plant 10, as illustrated in FIG. 1.

The cap 34 is then removed and the reservoir 22 is at least partially filled with water. The cap 34 is replaced to close the upper end 26 of the reservoir 22. The dial 38 of the valve 37 is then adjusted to create a partial vacuum at the upper end 26 of the reservoir 22 as water flows out of the drain opening 30. The creation of such a partial vacuum limits the flow of water out of the drain opening 30 by slowing the water flow due to the existence of the partial vacuum in the upper end 26 of the reservoir 22. Suitable regulation of the rate of flow out of the drain opening 30 ensures that the unattended watering apparatus 20 supplies water to the plant roots 12 for at least a predetermined duration of time.

By utilizing a flow dispensing cup 70 and some type of flow distribution apparatus within the cup 70, a uniformity of flow to the root system 12 of the plant 10 can be maintained through several different paths of flow, such as through the different flexible flow lines 90. Also, by utilizing the tip bucket arrangement shown in FIG. 8, water is provided to the roots 12 of the plant 10 at predetermined intervals, rather than on a continuous basis.

Undoubtedly, numerous different variations and modifications of the invention are possible within the scope of the invention. For example, a valve closure lobe can be formed as a lobe projecting downwardly in a direction parallel to the axis of rotation of the dial 38, rather than projecting radially outwardly therefrom, if the conduit 44 is routed across the floor of the annular recess 42. Such a system would result in control of the extent of a partial vacuum in the upper end 26 of the reservoir 22 in much the same manner as the apparatus of the pinch valve 37 illustrated and described. Other modifications to the invention are also possible. Accordingly, the scope of the invention should not be construed as limited to this specific embodiments depicted and described, but rather as defined in the claims appended hereto.

INDUSTRIAL APPLICABILITY

This invention may be industrially applied to the development, manufacture, and use of unattended system for watering live, growing plants, with particular applicability to potted houseplants.

What is claimed is:

1. An apparatus for watering plants comprising: a water reservoir having an encapsulated interior cavity and an exterior exposed to ambient air, and said reservoir has upper and lower ends and said located above the root level of a plant to be watered, wherein at least one drain opening is defined in said lower end of said water reservoir, and said upper end of said water reservoir is closed and is provided with an adjustable valve therein and an air conduit passing said valve and extending between said interior cavity and said exterior of said reservoir, whereby said valve is adjustable relative to said conduit to maintain a partial vacuum in said upper end of said reservoir as water drains from said lower end thereof;
  a flow dispensing cup located beneath said reservoir and including a transverse floor having a plurality of dispensing cup outlets therefrom and flow distribution apparatus located within said flow dispensing cup and beneath said reservoir to distribute water flow from said drain opening in said reservoir uniformly to said dispensing cup outlets;
  wherein said flow distribution apparatus is comprised of a balance support located above said transverse bottom of said flow dispensing cup, a balance arm having opposing ends and supported for rotation about a horizontal axis by said balance support, a concave upwardly facing water drip collection bucket located on one of said ends of said balance arm and directly beneath said drain opening in said lower end of said reservoir, and a counterbalancing weight located on the other of said ends of said balance arm.

2. In combination, a plant container having soil therein for a live plant having roots growing in said soil and a water reservoir located above the level of said roots of said plant, and said water reservoir is comprised of a closed, hollow container having an exterior exposed to ambient air and an encapsulated interior cavity, and said container has upper and lower ends, and at least one drain opening is defined in said lower end of said container and said upper end of said container is closed and has an air adjustable valve through which said conduit passes, whereby said adjustable valve regulates air flow through said conduit to allow a controlled partial vacuum to be created within said upper end of said container to thereby limit flow of water to said roots of said plant out of said drain opening in said lower end of said container;
  wherein said conduit is comprised of flexible walled tubing defining a lumen therethrough and said valve is a pinch valve;
  a fill opening in said upper end of said water reservoir and a removable cap engageable fluid tight in said fill opening and said cap has a body defining a central guide socket and a surrounding, cylindrical, annular recess and said flexible walled tubing crosses said cylindrical annular recess, and said adjustable valve is comprised of a movable valve element including a dial, a centering post depending from said dial and said centering post. fits into said central guide socket in said cap body and is rotatable within said guide socket, and further comprising a valve closure cam lobe depending from said dial and radially displaced from said centering post, whereby said dial is rotatable to bring said valve closure cam lobe into contact with said flexible walled tubing with a pressure that varies with angular rotation of said dial relative to said cap body, whereby said cam lobe is rotatable with said dial to press said flexible walled conduit against said cap body to constrict said flexible walled tubing to a selectively adjustable degree;
  a flow dispensing cup located beneath said reservoir and having a transverse floor spaced beneath said lower end of said' reservoir and including a plurality of flow outlets in said floor of said flow dispensing cup and apparatus for distributing flow of water from said drain opening in said lower end of said reservoir to said flow outlets in said floor of said flow dispensing cup;
  wherein said apparatus for distributing flow of water is comprised of a tip bucket mounted directly beneath said drain opening in said lower end of said reservoir and above said transverse floor of said flow dispensing cup.

* * * * *